US011465461B2

(12) United States Patent
Burkhard

(10) Patent No.: US 11,465,461 B2
(45) Date of Patent: Oct. 11, 2022

(54) CONSTRUCTION MACHINE AND METHOD FOR CONTROLLING A CONSTRUCTION MACHINE

(71) Applicant: Wirtgen GmbH, Windhagen (DE)

(72) Inventor: Frank Burkhard, Vettelschoß (DE)

(73) Assignee: Wirtgen GmbH

( * ) Notice: Subject to any disclaimer, the term of this patent is extended or adjusted under 35 U.S.C. 154(b) by 57 days.

(21) Appl. No.: 16/840,394

(22) Filed: Apr. 5, 2020

(65) Prior Publication Data

US 2020/0324602 A1    Oct. 15, 2020

(30) Foreign Application Priority Data

Apr. 12, 2019  (DE) ...................... 10 2019 109 773.8

(51) Int. Cl.
*B60G 21/00*  (2006.01)
*B60G 17/018*  (2006.01)
(Continued)

(52) U.S. Cl.
CPC .......... *B60G 17/018* (2013.01); *E01C 23/088* (2013.01); *F02B 63/06* (2013.01);
(Continued)

(58) Field of Classification Search
CPC ............ B60G 17/018; B60G 2204/201; B60G 2500/302; F01C 23/088; F02B 63/06; F15B 13/044
(Continued)

(56) References Cited

U.S. PATENT DOCUMENTS 3,535,877 A * 10/1970 Lanson ................. E02F 9/2292
60/422
3,994,133 A * 11/1976 Pfeil ....................... F15B 11/17
60/422
(Continued)

FOREIGN PATENT DOCUMENTS

CN      105134695 A      12/2015
DE       2435602 A1       2/1976
(Continued)

OTHER PUBLICATIONS

European Search Report on corresponding application No. 20156904.3, dated Aug. 20, 2020, 8 pages (not prior art).

*Primary Examiner* — Hung Q Nguyen
*Assistant Examiner* — Anthony Donald Taylor, Jr.
(74) *Attorney, Agent, or Firm* — Lucian Wayne Beavers; Patterson Intellectual Property Law, PC

(57) ABSTRACT

The invention relates to a construction machine, road milling machine, stabiliser, recycler, surface miner, and a to method for controlling a construction machine. The construction machine has a machine frame 2 supported by a chassis 1 and a plurality of hydraulic systems 15, 16, each of which has at least one hydraulic component 18, 22, at least one hydraulic pump 17, 21 for conveying hydraulic fluid for the at least one hydraulic component and at least one hydraulic line 28, 31 for transporting the hydraulic fluid from the at least one hydraulic pump to the at least one hydraulic component. The drive device of the construction machine comprises at least one internal combustion engine 24. A power transmission device 44 is provided for transmitting at least part of the drive power from the internal combustion engine 24 to the hydraulic pumps 17, 21. The construction machine according to the invention is characterised by a hydraulic control device 26, which is assigned to two hydraulic systems 15, 16 of the plurality of hydraulic (Continued)

systems. The hydraulic control device 16 is designed such that, in a special operating mode, at least part of the hydraulic fluid delivered by the hydraulic pump 17 of the one hydraulic system 15 is supplied to the other hydraulic system 16.

9 Claims, 4 Drawing Sheets

(51) Int. Cl.
    *E01C 23/088*     (2006.01)
    *F02B 63/06*     (2006.01)
    *F15B 13/044*     (2006.01)

(52) U.S. Cl.
    CPC ...... *F15B 13/044* (2013.01); *B60G 2204/201* (2013.01); *B60G 2500/302* (2013.01)

(58) Field of Classification Search
    USPC .......................................................... 180/41
    See application file for complete search history.

(56) References Cited

U.S. PATENT DOCUMENTS

| | | | | |
|---|---|---|---|---|
| 4,043,419 A | * | 8/1977 | Larson | B62D 5/07 180/402 |
| 4,044,786 A | * | 8/1977 | Yip | B62D 5/075 137/101 |
| 4,164,119 A | * | 8/1979 | Parquet | F15B 11/17 60/428 |
| 4,819,430 A | * | 4/1989 | Becker | F15B 11/17 60/421 |
| 4,928,487 A | * | 5/1990 | Nikolaus | F15B 1/02 60/414 |
| 5,101,627 A | * | 4/1992 | Fujii | E02F 9/2292 60/429 |
| 5,289,680 A | * | 3/1994 | Obe | A01B 63/1013 60/421 |
| 5,535,845 A | * | 7/1996 | Buschur | B62D 5/07 180/417 |
| 5,768,973 A | * | 6/1998 | Cochran | E02F 9/2225 91/516 |
| 5,826,487 A | * | 10/1998 | A'Hearn | F15B 11/05 91/516 |
| 5,881,630 A | * | 3/1999 | Buschur | F01P 7/048 91/516 |
| 5,918,558 A | * | 7/1999 | Susag | F15B 11/17 111/200 |
| 5,960,628 A | * | 10/1999 | Machesney | B62D 5/07 60/424 |
| 6,073,536 A | * | 6/2000 | Campbell | B62D 5/07 91/516 |
| 6,205,781 B1 | * | 3/2001 | A'Hearn | B62D 5/07 60/421 |
| 6,276,133 B1 | * | 8/2001 | Yoshida | F15B 11/17 60/421 |
| 7,127,887 B2 | * | 10/2006 | Nakamura | E02F 9/2228 60/421 |
| 7,464,545 B2 | * | 12/2008 | Vigholm | B62D 5/07 60/422 |
| 7,506,507 B2 | * | 3/2009 | Fransson | E02F 9/2217 60/443 |
| 8,756,930 B2 | | 6/2014 | Johnson et al. | |
| 9,212,601 B2 | * | 12/2015 | Meinheit | F02B 41/10 |
| 9,605,756 B1 | * | 3/2017 | Maiyur | F16H 47/02 |
| 9,783,056 B2 | | 10/2017 | Klein et al. | |
| 9,845,590 B2 | * | 12/2017 | Spielman | E02F 9/0841 |
| 9,885,374 B2 | * | 2/2018 | Christensen | B60R 16/08 |
| 9,903,098 B2 | * | 2/2018 | Vigholm | F15B 13/0433 |
| 2009/0108663 A1 | * | 4/2009 | Berning | E01C 23/088 299/1.5 |
| 2010/0043420 A1 | * | 2/2010 | Ikeda | F15B 11/17 60/420 |
| 2011/0011076 A1 | * | 1/2011 | Tanaka | E02F 9/2235 60/396 |
| 2011/0289908 A1 | * | 12/2011 | Johnson | B62D 5/07 60/327 |
| 2013/0047599 A1 | * | 2/2013 | Opdenbosch | E02F 9/2296 60/464 |
| 2014/0144130 A1 | * | 5/2014 | Vigholm | E02F 9/2296 60/327 |
| 2014/0150415 A1 | * | 6/2014 | Zhang | F15B 1/024 60/327 |

FOREIGN PATENT DOCUMENTS

| | | |
|---|---|---|
| DE | 10315496 A1 | 10/2004 |
| DE | 102007058534 A1 | 6/2009 |
| DE | 112011101827 T5 | 3/2013 |
| DE | 102015012560 A1 | 4/2016 |
| EP | 2270339 A1 | 1/2011 |
| EP | 2694747 A1 | 2/2014 |
| WO | 2011068441 A1 | 6/2011 |

* cited by examiner

CONSTRUCTION MACHINE AND METHOD FOR CONTROLLING A CONSTRUCTION MACHINE

BACKGROUND OF THE INVENTION

1. Field of the Invention

The invention relates to a construction machine, in particular a road milling machine, stabiliser, recycler or surface miner, and to a method for controlling a construction machine having a machine frame which is supported by a chassis.

2. Description of the Prior Art

The known self-propelled construction machines generally have a machine frame which is supported by a chassis having a plurality of running gears which can be tracks or wheels. Self-propelled construction machines are known which have working equipment for working the ground, for example for removing damaged road layers (road milling machine), for preparing the ground for road construction or reprocessing existing road surfaces (stabilisers, recyclers) or for mining mineral resources (surface miner). Lifting devices are generally assigned to the individual running gears of the construction machine, which lifting devices comprise piston arrangements/cylinder arrangements in order to be able to lower and raise the machine frame together with the work equipment relative to the ground surface. The drive power for all the units of the construction machine is generally provided by an internal combustion engine that has a cooling system comprising a cooler and a fan driven by a fan motor. Examples of construction machines include the known slipform pavers, road pavers, rollers, crushers, graders, loaders, cranes, etc.

The known construction machines have a plurality of hydraulic systems comprising hydraulic components that can perform certain functions. These components include, for example, the piston arrangements/cylinder arrangements for actuating the lifting devices and the fan motor for driving the fan of the cooling system. The hydraulic components are supplied with hydraulic fluid by hydraulic pumps, the hydraulic pumps being driven by the internal combustion engine. Operating elements are provided for operating the construction machine, with which the machine operator can influence the hydraulic components.

The individual hydraulic components of the construction machine have different power requirements depending on the respective function. The hydraulic pumps assigned to the hydraulic components are therefore dimensioned accordingly. The hydraulic pumps must be able to provide the hydraulic components with a certain volume flow of hydraulic fluid at a certain hydraulic pressure. In order to reduce the technical outlay and the associated manufacturing costs, the smallest possible dimensioning of the hydraulic pumps is aimed for in principle.

In the known construction machines, the hydraulic pumps are generally sufficiently dimensioned to be able to perform their function. In practice, however, it has been shown that individual hydraulic pumps cannot provide the associated hydraulic components with a sufficient volume flow of hydraulic fluid in a short time under certain operating conditions. The proper functioning of the hydraulic components can be ensured, but the dynamic behaviour of the components could be improved. These hydraulic components include, in particular, the piston arrangements/cylinder arrangements of the lifting devices for height adjustment of the machine frame, the travel speed of which could be increased such that the lifting devices could be retracted or extended more quickly.

SUMMARY OF THE INVENTION

The object of the invention is to improve the function of individual hydraulic components of a construction machine with relatively little technical effort, in particular to improve the dynamic behaviour of the hydraulic component in question.

This object is achieved according to the invention by the features of the independent claims. The dependent claims relate to preferred embodiments of the invention.

The construction machine according to the invention has a machine frame supported by a chassis and a plurality of hydraulic systems, each of which has at least one hydraulic component, at least one hydraulic pump for conveying hydraulic fluid for the at least one hydraulic component, and at least one hydraulic line for transporting the hydraulic fluid from the at least one hydraulic pump to at least one hydraulic component. In this context, "a plurality of hydraulic systems" is understood to mean at least two hydraulic systems.

In practice, a hydraulic system will only comprise one hydraulic pump. In practice, one hydraulic pump drives one or more hydraulic components. A hydraulic system having one or more hydraulic components can in principle also comprise a plurality of hydraulic pumps.

The drive device of the construction machine comprises at least one internal combustion engine. A power transmission device is provided for transmitting the drive power from the drive device to the plurality of hydraulic pumps.

The construction machine according to the invention is characterised by a hydraulic control device, which is assigned to two hydraulic systems of the plurality of hydraulic systems. The hydraulic control device is designed such that at least a part of the hydraulic fluid delivered by the at least one hydraulic pump of the first hydraulic system can be supplied to the second hydraulic system, such that the at least one hydraulic component of the second hydraulic system is operated with at least a part of the hydraulic fluid fed by the at least one hydraulic pump of the first hydraulic system and the hydraulic fluid fed by the at least one hydraulic pump of the second hydraulic system.

The basic principle of the invention is to make available at least part of the volume of hydraulic fluid that was made available by the hydraulic pump of the one hydraulic component in addition to the other hydraulic component under certain operating conditions. The two hydraulic pumps can have the same or different dimensions. If both hydraulic pumps have the same dimensions and the entire volume of hydraulic fluid supplied by one hydraulic pump is additionally supplied to the other hydraulic component, the volume flow can be doubled. As a result, a sufficient volume of hydraulic fluid is available for rapid operation of the respective component.

The only decisive factor for the invention is that part of the volume can be drawn off from one hydraulic system and fed to the other hydraulic system. However, this should only be the case under special operating conditions in order to improve the response behaviour of the hydraulic component in question or to increase the travel speed thereof. The special operating conditions are operating states of the at least one hydraulic component of the second hydraulic system, in which an undersupply of hydraulic fluid is given or is to be feared. These critical operating states can be recognised with suitable sensors. If a plurality of hydraulic components are operated by the hydraulic pump of the second hydraulic system, the critical operating state can be assumed to be the state in which all the hydraulic components or a certain number of hydraulic components are operated simultaneously.

If a first and a second hydraulic system are mentioned in this context, this only serves to differentiate between different hydraulic systems. Consequently, this does not mean that only two hydraulic systems can be provided. Rather, excess hydraulic fluid can also be supplied from a plurality of hydraulic systems to another hydraulic system, or excess hydraulic fluid from one hydraulic system can be supplied to a plurality of other hydraulic systems, or hydraulic fluid from a plurality of hydraulic systems can be supplied to a plurality of other hydraulic systems.

A preferred embodiment of the invention provides a hydraulic control element for controlling the volume flow of the hydraulic fluid flowing to the at least one hydraulic component of the first hydraulic system or for interrupting the fluid flow. This hydraulic control element interacts with the hydraulic control device in such a way that when the volume flow of the hydraulic fluid which is supplied to the at least one hydraulic component of the first hydraulic system is reduced or the fluid flow is interrupted, the hydraulic control device is actuated in such a way that the volume of hydraulic fluid, which is not supplied to the at least one hydraulic component of the first hydraulic system, is supplied to the at least one hydraulic component of the second hydraulic system. The reduction in the volume flow in one hydraulic system thus automatically leads to a corresponding increase in the volume flow in the other hydraulic system.

In one embodiment, the first hydraulic system comprises a hydraulic pump which has a suction connection and a pressure connection, wherein a suction line leading to a tank is connected to the suction connection and a pressure line leading to an inlet of the hydraulic control device is connected to the pressure connection. The hydraulic control device has a first outlet and a second outlet, wherein a pressure line leading to the at least one hydraulic component of the first hydraulic system, into which the hydraulic control element is switched, is connected to the first outlet, and a pressure line leading to the second hydraulic system is connected to the second outlet, such that hydraulic fluid can be supplied from the first hydraulic system to the second hydraulic system. A check valve is preferably arranged in the connecting line leading to the second hydraulic system, such that a backflow of hydraulic fluid from the second into the first hydraulic system is prevented.

The hydraulic control device can be designed as a proportional directional valve which can be controlled with hydraulic fluid and which has a first and a second control connection, wherein a first control line is connected to the first control connection, said first control line being connected to the pressure line leading to the at least one hydraulic component of the first hydraulic system downstream of the hydraulic control device and upstream of the hydraulic control element, and a second control line being connected to the second control connection, said second control line being connected to the pressure line leading to the at least one hydraulic component of the first hydraulic system downstream of the hydraulic control element. As a result, the proportional directional control valve is controlled depending on the differential pressure. This embodiment ensures reliable operation with a relatively low technical outlay. In principle, however, it is also possible to provide an electromagnetically actuated directional control valve instead of a medium-controlled directional control valve, wherein the pressure upstream and downstream of the hydraulic control element is measured by means of pressure gauges, the pressure signals of which are evaluated by means of a control unit that generates control signals for the electromagnetically actuated directional control valve.

The proportional directional valve can be resiliently tensioned into a position in which a flow connection is established between the inlet and the first outlet, in such a way that the directional valve assumes a defined operating state even in the case that the control lines are depressurised.

The hydraulic control element in the first hydraulic system can be designed as an electromagnetically controlled proportional valve or a shut-off valve. The valve can also be a directly controlled proportional valve. The selection of a directly controlled or a hydraulically or pneumatically pilot operated control valve can depend on the expected volume flows.

Another preferred embodiment provides that the construction machine has a control unit that is configured to actuate the hydraulic control element. Such a control unit can form a separate unit or can be part of the central control unit, which is already present in the known construction machines. The control unit is configured such that a boost operating mode is provided for the construction machine, in which the control element is actuated in such a way that the volume flow of the hydraulic fluid flowing to the at least one hydraulic component of the first hydraulic system is reduced or the fluid flow is interrupted. The control unit can be configured such that the boost operating mode is automatically switched when the at least one hydraulic component of the second hydraulic system is operated. An alternative embodiment provides an operating element for switching on the boost operating mode, the control unit being configured such that the boost operating mode is switched on when the operating element is actuated.

Switching on the relevant hydraulic component(s) thus automatically leads to an increase in the volume flow in the second hydraulic system under certain operating conditions. However, the increase in volume flow does not have to depend on the actuation of an operating element by the operator. It is also possible for the control unit to automatically increase the volume flow in the second hydraulic system in a certain operating state, which can be recognised, for example, by one or more sensors.

The hydraulic component can in principle be any component of the construction machine, provided that the component is operated hydraulically, for example a hydraulic motor or a piston arrangement/cylinder arrangement.

One embodiment provides that the hydraulic component is the hydraulic pump of the construction machine, which drives the fan of the cooler of the cooling system of the internal combustion engine of the construction machine. The hydraulic drive of the fan has proven to be a hydraulic component, the speed of which can be reduced for a predetermined relatively short period of time or which can be stopped without significantly impairing the function of the cooling system. As a result, the hydraulic system of the cooling system can supply excess hydraulic fluid to the other hydraulic system. Instead of the hydraulic motor of the fan, the hydraulic component of the first hydraulic system can also be a hydraulic motor, for example, which is provided in an air conditioning system of the construction machine for air conditioning the driver's cab.

In practice, it has been shown that in construction machines, for example road milling machines, stabilisers, recyclers, surface miners, the piston-cylinder arrangements associated with the lifting devices for height adjustment of the machine frame can only be extended relatively slowly when the construction machine is being relocated. When relocating the machine, all the piston-cylinder arrangements are generally extended at the same time. At this time, the work equipment of the construction machine, for example the milling drum of a road milling machine, is out of operation. A high fan speed can be temporarily dispensed with when relocating the machine. A special embodiment therefore provides that in the operating state of the machine being moved, at least part of the volume of hydraulic fluid of the hydraulic system, in which the hydraulic motor of the fan is located, is supplied to the hydraulic system in which the piston-cylinder arrangements of the lifting devices are located. As a result of the excess hydraulic fluid, these piston-cylinder arrangements can thus be extended quickly and the process of relocating the machine can be ended quickly.

Two embodiments of the invention will be explained in detail below with reference to the drawings.

DETAILED DESCRIPTION

Figure 1:
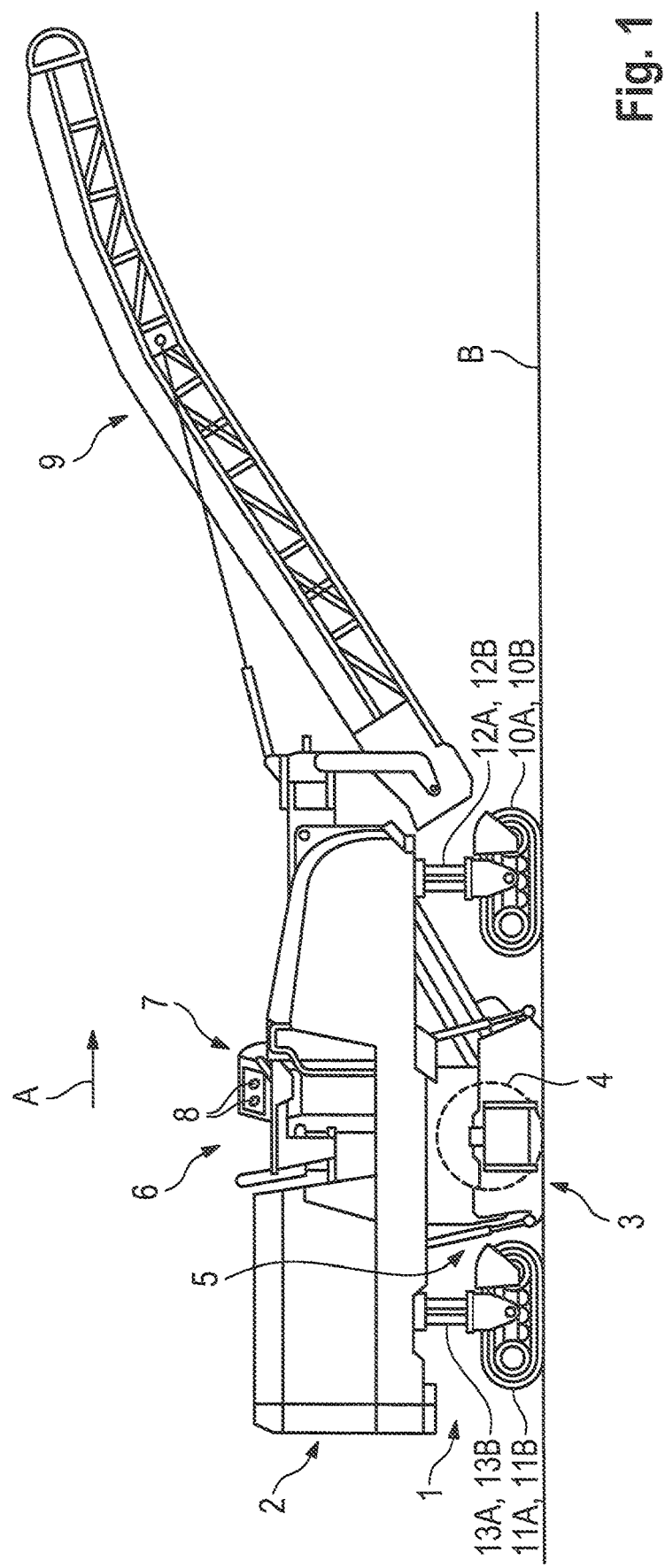
FIG. 1 is a side view of an embodiment of a self-propelled construction machine.
Figure 2:
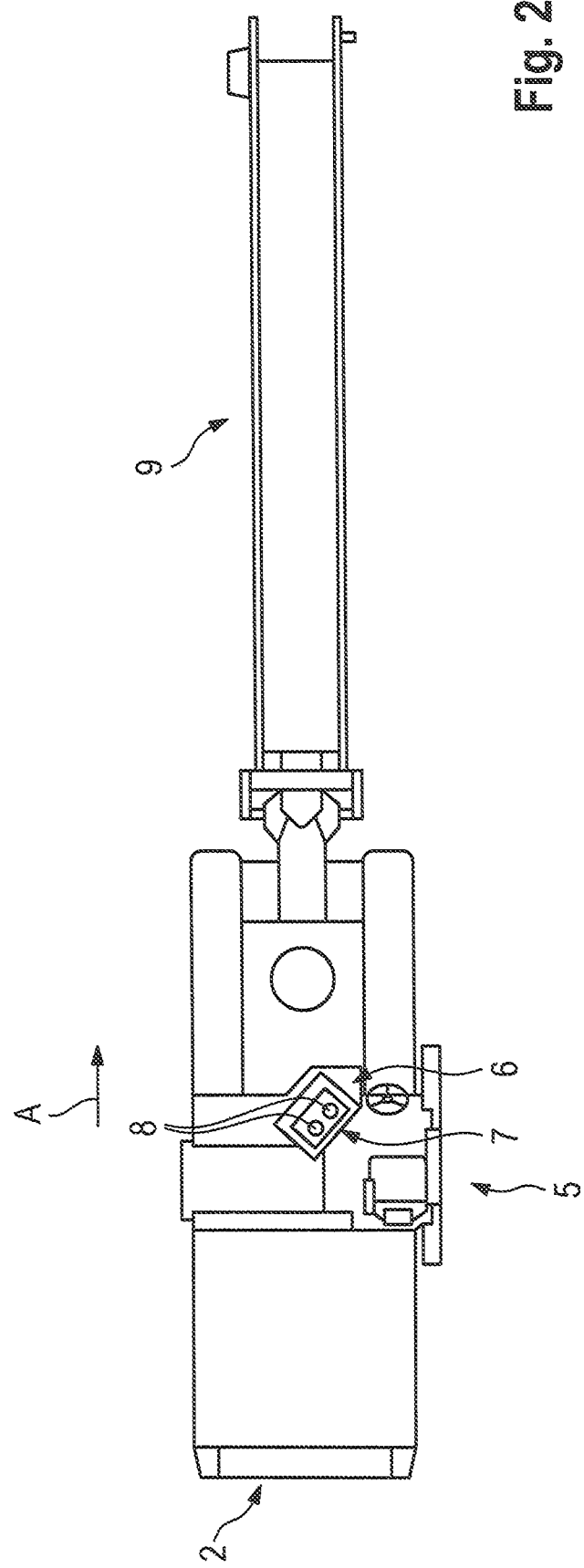
FIG. 2 is a plan view of the construction machine from FIG. 1.

FIGS. 1 and 2 show inside and top view, as an example of a construction machine, a self-propelled road milling machine for milling road surfaces, which is a front loading road milling machine. The construction machine has a machine frame 2 supported by a chassis 1, on which work equipment 3 is arranged, with which the work required for the construction measure can be carried out. The work equipment 3 has a milling drum 4, which is only schematically shown in FIG. 1 and is arranged in a milling drum housing 5. Above the milling drum housing 5, there is the operator station 6 on the machine frame having an operating panel 7 for the machine operator. The operating panel 7 has a plurality of operating elements 8 which the machine operator can operate. The milled material is removed by a conveyor 9 which is pivotally arranged on the front of the machine frame 2.

The construction machine has in the working direction A front left running gear 10A and a front right running gear 10B and a rear left running gear 11A and a rear right running gear 11B, to which are assigned a front, left and right lifting device 12A, 12B and a rear, left and right lifting device 13A, 13B in the working direction A, such that the height and inclination of the machine frame 2 relative to the ground surface B can be changed by retracting or extending the lifting devices. The running gears may also be referred to as ground engaging units. The lifting devices may also be referred to as lifting columns.

Figure 3:
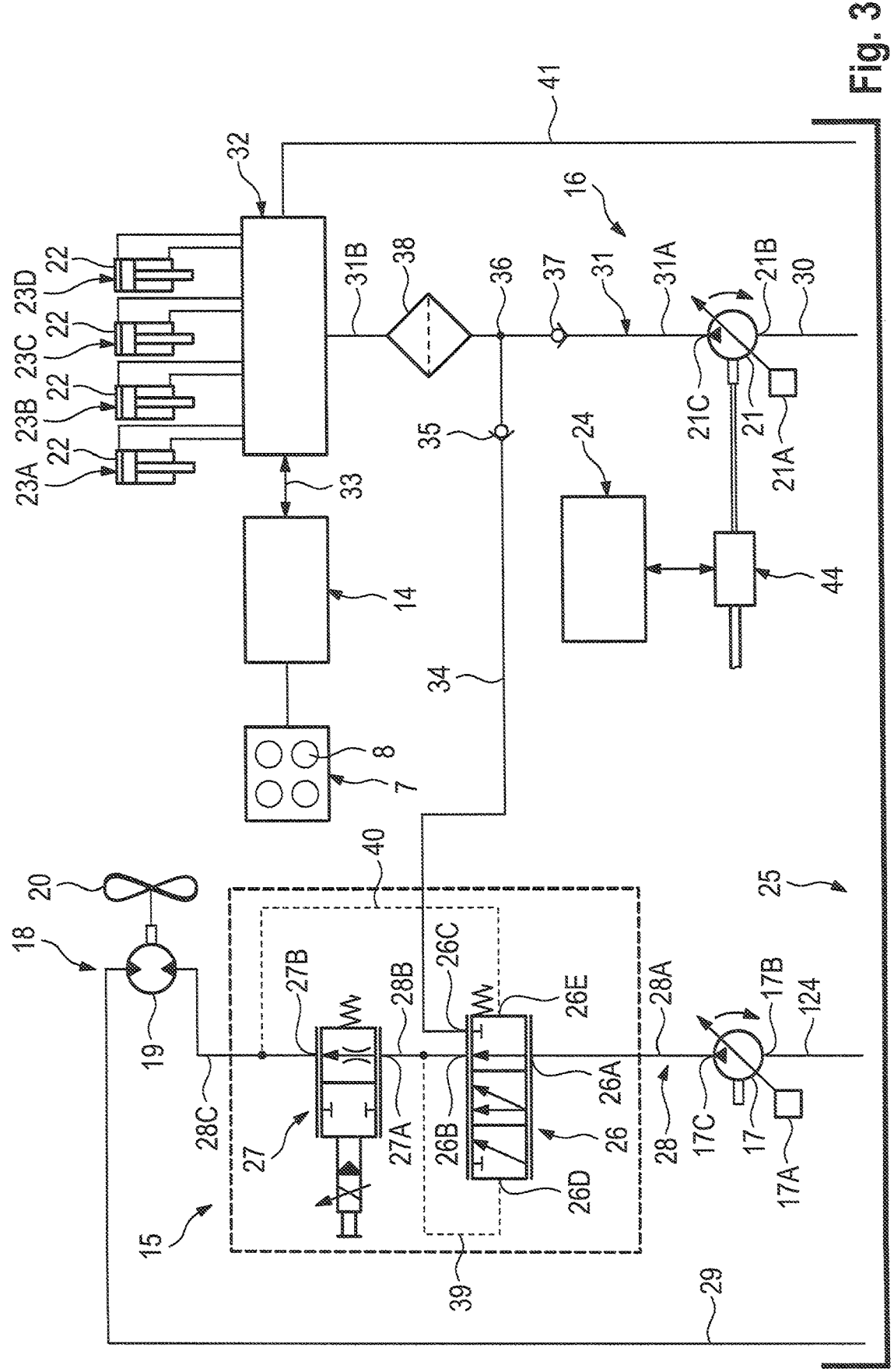
FIG. 3 shows two hydraulic systems of the construction machine.

The drive power for the traction drive and the work equipment as well as other units of the construction machine is provided by an internal combustion engine (not shown in FIGS. 1 and 2) which is shown in FIG. 3, in which the components of the construction machine that are essential for the invention are shown schematically. The internal combustion engine 24 has a cooling system that has a cooler and a fan 20. The fan 20 is driven by a hydraulic motor 19. The lifting devices 12A, 12B, 13A, 13B for height adjustment of the machine frame 2 are each actuated by a piston arrangement/cylinder arrangement 23A, 23B, 23C, 23D. The hydraulic motor 19 of the fan and the piston arrangements/cylinder arrangements 23A, 23B, 23C, 23D assigned to the lifting devices represent examples of components which are referred to as hydraulic components of the construction machine. The piston arrangements/cylinder arrangements may also be referred to as hydraulic piston and cylinder units.

In addition to the hydraulic motor 19 for the fan and the piston arrangements/cylinder arrangements of the lifting devices, the construction machine generally has further hydraulic components. A road milling machine has, for example, a piston arrangement/cylinder arrangement for raising or lowering an edge protector, a hold-down device or a wiper, or a construction machine has, for example, a hydraulic motor for an air conditioning system for air conditioning a driver's cab. The individual hydraulic components are supplied with hydraulic fluid by hydraulic pumps. The hydraulic pumps are driven by the internal combustion engine. To transmit at least part of the drive power of the internal combustion engine to the hydraulic pumps, a force transmission device is provided, which can have a pump distributor gear.

In addition, the construction machine has a central control unit 14 and an operating panel 7 having operating elements 8, for example switches or buttons or graphical representations on a touch screen.

The central control unit 14 can comprise analogue or digital circuits. For example, it can have a generic processor, a digital signal processor (DSP) for continuous editing of digital signals, a microprocessor, an application-specific integrated circuit (ASIC), an integrated circuit consisting of logic members (FPGA), or other integrated circuits (IC) or hardware components. A data processing program (software) can run on the hardware components in order to be able to control the individual components of the construction machine.

The construction machine has various hydraulic systems. In FIG. 3, only two hydraulic systems 15 and 16 of the plurality of hydraulic systems of the construction machine are shown. Both hydraulic systems 15, 16 are open systems. The invention could also be implemented on closed hydraulic systems. However, it must be ensured that the additional oil quantity supplied to the respective hydraulic circuit is removed from the hydraulic circuit after the load. This could be done using a flush valve, for example.

In the present embodiment, the first hydraulic system 15 comprises a hydraulic pump 17 for supplying a hydraulic component 18 with hydraulic fluid, for example for supplying the hydraulic motor 19 for driving the fan of the cooling system of the internal combustion engine 24 with hydraulic fluid, and the fan 20. The second hydraulic system 16 comprises a hydraulic pump 21 for supplying further hydraulic components 22 with hydraulic fluid, for example for supplying the piston arrangements/cylinder arrangements 23A, 23B, 23C, 23D associated with the lifting devices 12A, 12B and 13A, 13B with hydraulic fluid. The hydraulic pumps 17, 21 of the first and second hydraulic systems 15, 16 can be pumps that can deliver the same volume flow of hydraulic fluid with the same pressure, for example 300 l/min at 240 bar. However, the two hydraulic systems 15, 16 can also comprise other hydraulic components. FIG. 3 also schematically shows the internal combustion engine 24 of the construction machine and the power transmission device 44, for example a pump distributor gear connected to the internal combustion engine, to which the hydraulic pumps 17, 21 are connected. The power transmission device 44 may also be referred to as a power transmission.

In the present embodiment, the hydraulic pump 17 of the first hydraulic system 15 is a variable displacement pump having an electromagnetically controlled proportional pressure regulating valve 17A, which is controlled by the central control unit 14, such that the volume flow of the pump 17 can be controlled. A suction line 124, which leads to a tank 25, is connected to the suction connection 17B of the hydraulic pump 17, such that the hydraulic pump 17 can suck in hydraulic fluid from the tank 25.

In addition to the hydraulic pump 17 and the hydraulic motor 19 of the fan 20, the first hydraulic system 15 comprises a hydraulic control device 26 and a hydraulic control element 27. The hydraulic control device 26 can be a priority valve, which ensures that the required volume flow to the hydraulic component 18 has priority.

In the present embodiment, the hydraulic control device 26 is a proportional directional valve which is controlled by hydraulic fluid and has an inlet 26A and a first outlet 26B and a second outlet 26C as well as a first control connection 26D and a second control connection 26E. The proportional directional valve is resiliently biased to a position in which fluid communication is established between the inlet 26A and the first outlet 26B. When the sealing body of the valve is moved against the spring tension, some or all of the volume of hydraulic fluid flows to the second outlet 26C. The hydraulic control device 26 may also be referred to as a first hydraulic control valve 26.

The hydraulic control element 27 is an electromagnetically controlled proportional valve which is controlled by the central control unit 14. The hydraulic control element 27 has an inlet 27A and an outlet 27B. The flow of hydraulic fluid from the inlet 27A to the outlet 27B depends on the position of the sealing body of the valve. The hydraulic control element 27 may also be referred to as a second hydraulic control valve 27.

A first line portion 28A of a pressure line 28 connects the pressure connection 17C of the hydraulic pump 17 to the inlet 26A of the hydraulic control device 26 and a second line portion 28B of the pressure line 28 connects the first outlet 26B of the control device 26 to the inlet 27A of the hydraulic control element 27. The outlet 27B of the control element 27 is connected to the one connection of the hydraulic motor 19 via a third line portion 28C of the pressure line 28, while the other connection of the hydraulic motor 19 is connected to the tank 25 via a return line 29.

A first control line 39 for hydraulic fluid branches off from the second line portion 28B of the pressure line 28 upstream of the control element 27 and leads to the first control connection 26D of the control device 26, and a second control line 40 for hydraulic fluid branches off from the third line portion 28C of the pressure line 28 downstream of the control element 27 and leads to the second control connection 26E of the control device 26.

When the central control unit 14 sends a control signal to partially close or completely shut off the control element 27, the pressure in the second line portion 28B of the pressure line 28 upstream of the control element 27 increases, and the pressure in the third line portion 28C of the pressure line 28 downstream of the control element 27 decreases, such that the closure body of the control device 26 is displaced against the spring force as a function of the pressure difference, i.e. the position of the sealing body of the valve. As a result, at least part of the volume of the hydraulic fluid is diverted to the second outlet 26C of the control device 26.

The line system of the second hydraulic system 16 comprises a suction line 30, which is connected to the suction connection 21B of the hydraulic pump 21 of the second hydraulic system 16 and leads to the tank 25. The hydraulic pump 21 has a hydraulic pressure regulator 21A, such that the pressure in the second hydraulic system 16 is kept constant. A pressure line 31 connects the outlet 21C of the hydraulic pump 21 to a second hydraulic control device 32, only shown schematically, for controlling the inflow or outflow of hydraulic fluid into the cylinder spaces of the piston arrangements/cylinder arrangements 23A, 23B, 23C, 23D of the lifting devices 12A, 12B, 13A, 13B. The second hydraulic control device 32 receives control signals from the central control unit 14 via a control line 33. The second control device 32 controls the flow of hydraulic fluid in dependence on the control signals in such a way that hydraulic fluid for extending or retracting the pistons is supplied to or removed from the piston arrangements/cylinder arrangements 23A, 23B, 23C, 23D. In order to raise the machine frame 2 of the construction machine, hydraulic fluid is fed into the relevant cylinder spaces of all the piston arrangements/cylinder arrangements 23A, 23B, 23C, 23D. The hydraulic fluid flows from the other cylinder spaces into the tank 25 via a return line 41.

The second outlet 26C of the hydraulic control device 26 of the first hydraulic system 15 is connected to the second hydraulic system 16 via a connecting line 34, in which a first check valve 35 is arranged. A second check valve 37 is located in the line portion 31A of the pressure line 31 of the second hydraulic system 16 upstream of the connection point 36 of the connecting line 34. The first check valve 35 prevents backflow of hydraulic fluid from the second hydraulic system 16 into the first hydraulic system 15 and the second check valve 37 prevents backflow of hydraulic fluid into the hydraulic pump 21 of the second hydraulic system 16. The check valves 35, 37 thus provide additional protection against an undesired volume flow from one system to the other. However, the check valves are not absolutely necessary. A filter 38 is arranged in the line portion 31B of the pressure line 31 of the second hydraulic system 16 downstream of the connection point 36 of the connecting line 34.

When the central control unit 14 sends a control signal in order to partially close or shut off the control element 27, the pressure in the second line portion 28B of the pressure line 28 upstream of the control element 27 increases and the pressure in the third line portion 28C of the pressure line 28 downstream of the control element 27 decreases. Depending on the pressure difference, at least part of the hydraulic fluid is thus diverted into the second hydraulic system 16.

A road milling machine or a surface miner, for example, can machine the terrain in successive work stages. The machine must then be relocated between the work stages. The work equipment of the construction machine is not in operation during the relocation.

The central control unit 14 provides a special operating mode in which additional hydraulic fluid can be made available to the piston arrangements/cylinder arrangements 23A, 23B, 23C, 23D of the lifting devices 12A, 12B, 13A, 13B. This operating mode, which is referred to as the boost operating mode, can be activated, for example, or is automatically activated when the piston arrangements/cylinder arrangements 23A, 23B, 23C, 23D are to be extended as quickly as possible. This is the case, for example, when the construction machine is to be relocated.

In the boost operating mode, the control unit 14 controls the control element 27 in the first hydraulic system 15 such that the supply of hydraulic fluid to the hydraulic motor 19 of the fan 20 is at least partially interrupted. At this time, the control unit 14 controls the pressure control valve 17A of the hydraulic pump 17 of the first hydraulic system 15 in such a way that a pressure is established in the first hydraulic system 15 that is equal to the pressure in the second hydraulic system 16. If the fan 20 is already being operated at maximum speed at this point, intervention in the fan control is not necessary, which, however, presupposes a corresponding dimensioning of the two hydraulic pumps 17, 21. However, it is also possible for the control unit 14 to control the pressure control valve 17A of the hydraulic pump 17 of the first hydraulic system 15 in such a way that a pressure is established in the first hydraulic system 15 that is greater than the pressure in the second hydraulic system 16. This then leads to an increase in pressure in the second hydraulic system 16.

It is assumed that the hydraulic pumps 17, 21 of the first and second hydraulic systems 15, 16 convey hydraulic fluid with a volume flow of 200 l/min Due to the pressure difference, the control device 26 in the first hydraulic system 15 is activated such that the hydraulic fluid is at least partially diverted into the second hydraulic system 16, as a result of which the travel speed of the piston arrangements/cylinder arrangements 23A, 23B, 23C, 23D is increased. For example, while the hydraulic motor 19 of the fan 20 is still operating at 100 l/min, 100 l/min of hydraulic fluid flows via the connecting line 34 into the second hydraulic system 16, such that a total of 300 l/min are available for the piston arrangements/cylinder arrangements 23A, 23B, 23C, 23D of the lifting devices 12A, 12B, 13A, 13B.

Figure 4:
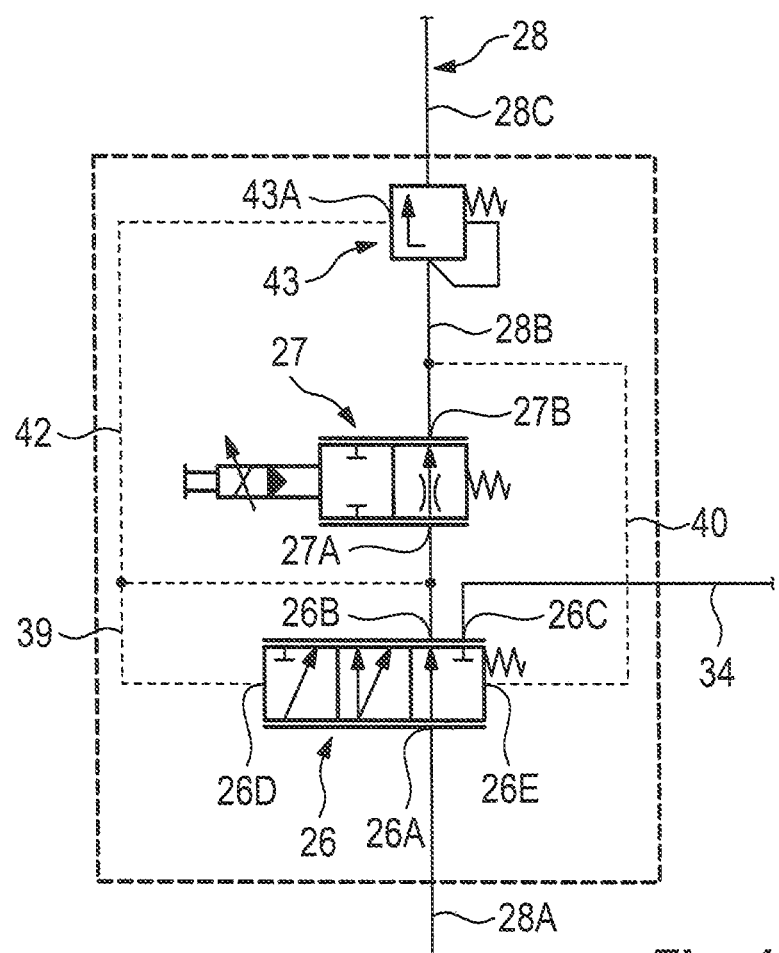
FIG. 4 shows another embodiment of the hydraulic control element and the hydraulic control device of a hydraulic system of the construction machine.

FIG. 4 shows a second embodiment, which differs from the embodiment described with reference to FIG. 3 only by an additional pressure compensator 43. In FIG. 4, only the part of the hydraulic system is shown by which the two embodiments differ from one another. Corresponding parts are provided with the same reference signs. The pressure compensator 43 is arranged in the third line portion 28C of the pressure line 28 downstream of the control element 27 and upstream of the hydraulic motor 19. The control connection 43A of the pressure compensator 43 is connected to the first control line 39 via a third control line 42. With the pressure compensator 43, a volume flow control independent of the load pressure can be achieved. In the specific application, however, such a pressure compensator is not necessary, since volume flow control independent of the load pressure does not offer any advantages in practice in the case of fan operation.

The invention claimed is:

1. A construction machine, comprising:
   a machine frame;
   a plurality of ground engaging units for supporting the machine frame from a ground surface;
   a cooling system including a fan;
   a plurality of lifting columns supporting the machine frame from the plurality of ground engaging units for adjusting a height of the machine frame relative to the ground surface, each of the lifting columns including a hydraulic piston and cylinder unit;
   at least a first hydraulic system and a second hydraulic system, each of the hydraulic systems including:
   at least one hydraulic component;
   at least one hydraulic pump for conveying hydraulic fluid for the at least one hydraulic component; and
   at least one hydraulic line for supplying the hydraulic fluid to the at least one hydraulic component;
   at least one internal combustion engine supported from the machine frame;
   a power transmission configured to transfer at least a part of a drive power from the at least one internal combustion engine to the at least one hydraulic pump of the first hydraulic system and the at least one hydraulic pump of the second hydraulic system;
   wherein the at least one hydraulic component of the first hydraulic system includes a hydraulic motor configured to drive the fan;
   wherein the at least one hydraulic component of the second hydraulic system includes the hydraulic piston and cylinder units of the lifting columns;
   a first hydraulic control valve operably associated with the first and second hydraulic systems, the first hydraulic control valve being configured such that at least a part of the hydraulic fluid conveyed by the at least one hydraulic pump of the first hydraulic system can be supplied to the second hydraulic system, such that the hydraulic piston and cylinder units of the lifting columns are operated with the part of the hydraulic fluid conveyed by the at least one hydraulic pump of the first hydraulic system and the hydraulic fluid conveyed by the at least one hydraulic pump of the second hydraulic system; and
   a second hydraulic control valve configured to reduce or interrupt a volume flow of the hydraulic fluid supplied to the at least one hydraulic component of the first hydraulic system, wherein the second hydraulic control valve interacts with the first hydraulic control valve such that when the volume flow of the hydraulic fluid which is supplied to the at least one hydraulic component of the first hydraulic system is reduced or interrupted, the first hydraulic control valve is actuated such that a volume flow of the hydraulic fluid which is not supplied to the at least one hydraulic component of the first hydraulic system is supplied to the at least one hydraulic component of the second hydraulic system.

2. The construction machine of claim 1, further comprising:
   a tank containing hydraulic fluid;
   wherein the first hydraulic control valve includes an inlet, a first outlet, and a second outlet;
   wherein the at least one hydraulic pump of the first hydraulic system includes a suction connection and a pressure connection;
   a suction line connecting the tank to the suction connection;
   wherein the at least one hydraulic line of the first hydraulic system includes a pressure line including a first line portion connecting the pressure connection to the inlet of the first hydraulic control valve, a second line portion connecting the first outlet of the first hydraulic control valve to the second hydraulic control valve, and a third line portion connecting the second hydraulic control valve to the at least one hydraulic component of the first hydraulic system; and
   a connecting line connecting the second outlet of the first hydraulic control valve to the second hydraulic system.

3. The construction machine of claim 2, further comprising:
   a check valve disposed in the connecting line.

4. The construction machine of claim 2, wherein:
the first hydraulic control valve is a proportional directional valve configured to be controlled by hydraulic fluid, and the proportional directional valve including first control connection and a second control connection;
the proportional directional valve further comprising:
a first control line connecting the first control connection to the second line portion downstream of the first hydraulic control valve and upstream of the second hydraulic control valve; and
a second control line connecting the second control connection to the third line portion downstream of the second hydraulic control valve.

5. The construction machine of claim 1, wherein:
the second hydraulic control valve is an electromagnetically controlled proportional valve or an electromagnetically controlled shut-off valve.

6. The construction machine of claim 1, further comprising:
a controller configured to provide a boost operating mode wherein the second hydraulic control valve is actuated such that the volume flow of the hydraulic fluid supplied to the at least one hydraulic component of the first hydraulic system is reduced or interrupted.

7. The construction machine of claim 6, wherein:
the controller is configured such that the boost operating mode is automatically switched on when the at least one hydraulic component of the second hydraulic system is operated.

8. The construction machine of claim 6, further comprising:
an operating element actuatable by a human operator of the construction machine to switch on the boost operating mode,
wherein the controller is configured such that the boost operating mode is switched on when the operating element is actuated.

9. A method of controlling a construction machine, the construction machine including:
a machine frame;
a plurality of ground engaging units for supporting the machine frame from a ground surface;
at least a first hydraulic system and a second hydraulic system, each of the hydraulic systems including:
at least one hydraulic component;
at least one hydraulic pump for conveying hydraulic fluid for the at least one hydraulic component; and
at least one hydraulic line for supplying the hydraulic fluid to the at least one hydraulic component;
at least one internal combustion engine supported from the machine frame;
a power transmission configured to transfer at least a part of a drive power from the at least one internal combustion engine to the at least one hydraulic pump of the first hydraulic system and the at least one hydraulic pump of the second hydraulic system;
a plurality of lifting columns supporting the machine frame from the plurality of ground engaging units for adjusting a height of the machine frame relative to the ground surface, each of the lifting columns including a hydraulic piston and cylinder unit; and
a cooling system including a fan, the fan being driven by a hydraulic motor;
wherein the at least one hydraulic component of the first hydraulic system includes the hydraulic motor driving the fan;
wherein the at least one hydraulic component of the second hydraulic system includes the hydraulic piston and cylinder units of the lifting columns;
a first hydraulic control valve operably associated with the first and second hydraulic systems; and
a second hydraulic control valve configured to reduce or interrupt a volume flow of the hydraulic fluid supplied to the at least one hydraulic component of the first hydraulic system;
wherein the method comprises:
providing a boost operating mode with a controller configured such that:
at least a part of the hydraulic fluid conveyed by the at least one hydraulic pump of the first hydraulic system is supplied to the second hydraulic system; and
the hydraulic piston and cylinder units of the lifting columns are operated with the part of the hydraulic fluid supplied to the second hydraulic system from the at least one hydraulic pump of the first hydraulic system and with the hydraulic fluid conveyed by the at least one hydraulic pump of the second hydraulic system;
wherein when the volume flow of the hydraulic fluid supplied to the at least one hydraulic component of the first hydraulic system is reduced or interrupted, a volume flow of the hydraulic fluid from the at least one hydraulic pump of the first hydraulic system which is not supplied to the at least one hydraulic component of the first hydraulic system is supplied to the at least one hydraulic component of the second hydraulic system via the first hydraulic control valve.

* * * * *